US005996400A

United States Patent [19]

Nishioka et al.

[11] Patent Number: 5,996,400

[45] Date of Patent: Dec. 7, 1999

[54] DIAGNOSTIC SYSTEM FOR DETECTING LEAKAGE OF FUEL VAPOR FROM PURGE SYSTEM

[75] Inventors: Futoshi Nishioka; Katsuhiko Sakamoto; Tetsushi Hosokai; Shingo Shigihama; Susumu Takano, all of Hiroshima, Japan

[73] Assignee: Mazda Motor Corporation, Hiroshima, Japan

[21] Appl. No.: 08/829,692

[22] Filed: Mar. 31, 1997

[30] Foreign Application Priority Data

Mar. 29, 1996 [JP] Japan .................................... 8-103641

[51] Int. Cl.[6] ...................................................... G01M 3/08

[52] U.S. Cl. .......................................................... 73/40.5 R

[58] Field of Search ............................... 123/520, 198 D, 123/518, 519; 73/118.1, 40.5 R

[56] References Cited

U.S. PATENT DOCUMENTS

| | | | |
|---|---|---|---|
| 5,143,035 | 9/1992 | Kayanuma | 123/198 D |
| 5,158,054 | 10/1992 | Otsuka | 123/198 D |
| 5,267,470 | 12/1993 | Cook | 73/118.1 X |
| 5,295,472 | 3/1994 | Otsuka et al. | 123/520 |
| 5,315,980 | 5/1994 | Otsuka et al. | 123/520 |
| 5,333,589 | 8/1994 | Otsuka | 123/520 |
| 5,355,863 | 10/1994 | Yamanaka et al. | 123/520 |
| 5,396,873 | 3/1995 | Yamanaka et al. | 123/520 |
| 5,425,344 | 6/1995 | Otsuka et al. | 123/520 |
| 5,427,075 | 6/1995 | Yamanaka et al. | 123/520 |
| 5,447,141 | 9/1995 | Kitamoto et al. | 123/520 |
| 5,495,749 | 3/1996 | Dawson et al. | 73/118.1 X |
| 5,629,477 | 5/1997 | Ito | 73/118.1 |
| 5,635,633 | 6/1997 | Kadota | 73/118.1 |
| 5,669,362 | 9/1997 | Shinohara et al. | 123/520 |
| 5,678,523 | 10/1997 | Hashimoto et al. | 123/520 |

FOREIGN PATENT DOCUMENTS

| | | |
|---|---|---|
| 4-362264 | 12/1992 | Japan . |
| 6-74106 | 3/1994 | Japan . |

*Primary Examiner*—Hezron Williams
*Assistant Examiner*—Jay L. Politzer
*Attorney, Agent, or Firm*—Sixbey, Friedman, Leedom & Ferguson, P.C.; Donald R. Studebaker

[57] ABSTRACT

A leakage diagnostic system for making a judgement of leakage of a fuel purge system, which has in order from the side of a fuel tank a control valve, a canister and a purge valve disposed in a purge passage and a relief valve isolating the canister from the atmosphere, based on a rising rate of pressure in the purge passage between the fuel tank and the intake system isolated from the atmosphere after lowering and keeping the interior of the purge passage below specified negative pressure level for a specified period of time. When the interior of the fuel tank increases above a threshold level after a specified period of time, the leakage diagnostic system delivers a judgement of leakage of the purge system.

12 Claims, 9 Drawing Sheets

DIAGNOSTIC SYSTEM FOR DETECTING LEAKAGE OF FUEL VAPOR FROM PURGE SYSTEM

BACKGROUND OF THE INVENTION

1. Field of the Invention

This invention relates to a diagnostic system for detecting leakage of fuel vapor from a purge system installed between an intake manifold and a fuel tank.

2. Description of Related Art

In order for gasoline engines, in particular automobile engines, to prevent release of either liquid fuel or fuel vapor into the atmosphere, an evaporation control system or a purge system is installed to collect fuel vapor. This evaporation control system is basically comprised of a canister and a purge valve disposed between an intake manifold and a fuel tank. Fuel vapor from the fuel tank is adsorbed in the canister and purged with negative intake pressure into the intake manifold from the canister.

Leakage of fuel vapor from the purge passage leads to evaporative emission into the atmosphere. In view of this point, it is important to detect leakage of fuel vapor from the evaporation control system. One of leakage detection techniques is known from, for instance. Japanese Unexamined Patent Publication No. 6- 74106. The prior art leakage detection is made based on a rising rate of the pressure in the purge passage lowered below the atmospheric pressure level and air-tightly closed. A problem of the prior art leakage detection is that a change in pressure is hardly understandable whether it is caused due to leakage or due to an increased amount of fuel vapor in external circumstances that cause an increased yield of fuel vapor. Consequently, the prior art leakage detection is interrupted in such external circumstances.

Japanese Unexamined Patent Publication No. 4- 362264 discloses a system for diagnosing a fault of a purge system under the condition that the engine remains below a specified temperature immediately after a start of engine operation, in other words, in a state where liquid fuel in the fuel tank is free from evaporation due to a rise in temperature of the liquid fuel.

It is practically difficult to directly detect whether fuel vapor is increasing at a high rate. Consequently, whether or not the rate of an increase in the amount of fuel vapor is high is indirectly detected by the utilization of a parameter relating to an increase in the amount of fuel vapor. For this reason, in view of preventing the leakage judgement from resulting in errors, the importance is to establish such a detectable state of the fact that the amount of fuel vapor increases and to provide sufficiently frequent opportunities to make the leakage judgement.

SUMMARY OF THE INVITATION

It is an object of the present invention to provide a leakage diagnostic system for a purge control system which prevents erroneous judgements while providing frequent opportunities to make a leakage judgement.

The above object of the invention is achieved by providing a diagnostic stem for making a judgement of leakage of a fuel purge system based on a rising rate of pressure in purge passage mean between a fuel tank and an intake system of an engine isolated from the atmosphere after lowering the interior of the purge passage below a specified negative pressure level. The leakage diagnostic system controls a pressure regulating means to cause a change in negative pressure level in a purge passage, and compares a change in the negative pressure level caused within a specified period of time with a judging level to deliver a judgement of leakage from the fuel purge system when the change is larger than the judging level. The judging level is changed under a specified engine operating condition so as to make it hard to deliver a judgement of leakage after passage of the specified period of time from a point of time at which the specified engine operating condition is established. Fuel returned to the fuel tank is heated by the engine and agitates the liquid fuel in the fuel tank to generate bubbles which are easy to evaporate. Accordingly, as the amount of fuel returned to the fuel tank increases, the liquid fuel evaporates at an increased rate.

The leakage diagnostic system isolates the purge system from the atmosphere after lowing pressure in the purge system below an atmospheric pressure level, and delivers a judgement of leakage of the purge system when the change caused within another period of time shorter than the specified period of time is larger than the judging level. The judgement of leakage may be performed immediately after a start of engine operation or immediately after idling of the engine. The leakage diagnostic system includes, as a pressure regulation means, a purge valve for purging fuel vapor into the purge passage and a relief valve disposed upstream in the purge passage from the purge valve for communicating the purge passage with the atmosphere, and opens the purge valve while closing the relief valve to develop negative pressure in the purge passage. Further, the leakage diagnostic system closes the purge valve when the negative pressure is developed to a specified level so as to isolate the purge passage from the atmosphere.

According to a preferred embodiment of the invention, the leakage diagnostic system correctly changes the judging level so as to make it more hard to deliver a judgement of leakage as atmospherc pressure level decreases, or otherwise as engine temperature at a start of engine operation increases. Further, the judging level may be correctly decreased as liquid fuel in a fuel tank quantitatively decreases.

The leakage diagnostic system is adapted to detect specific external circumstances which cause an increased yield of fuel vapor in the fuel tank, and to change the period of time for which the leakage diagnostic system performs the judgement of leakage to be shorter when detecting the external circumstances.

By specifying the period of time for which the rate of fuel evaporation increases due to returned fuel as a time form the judgement of leakage as described above, while providing sufficiently frequent opportunities to make the leakage jugdement, the judgement of leakage is prevented from resulting in errors.

BRIEF DESCRIPTION OF THE DRAWINGS

Above and other objects and features of the invention will be understood from the following description relating to specific embodiments thereof when reading in conjunction with the accompanying drawings, in which.

DETAIL DESCRIPTION OF THE SPECIFIC EMBODIMENT

Figure 1:
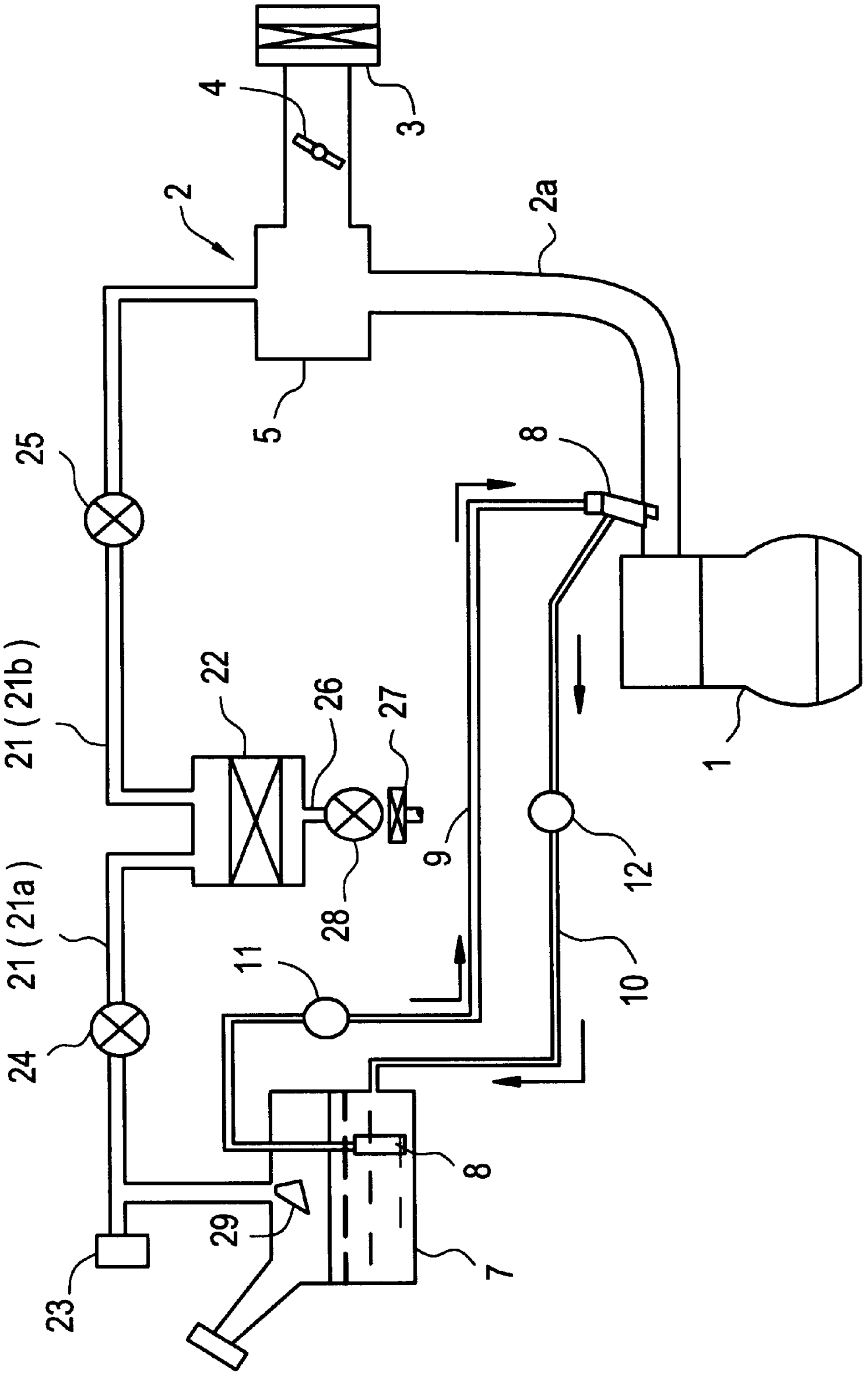
FIG. 1 is a schematic view showing a purge system whose leakage is detected by a leakage detection system in accordance with an embodiment of the invention.

Referring to the drawings in detail, in particular, to FIG. 1 showing an evaporatation control system, an internal combustion engine 1 has an intake manifold 2 provided from the upstream side with an air cleaner 3, a throttle valve 4, and a surge tank 5. As of the intake system 2 between the engine 1 and the surge tank 5 is formed as an intake manifold 2*a* including independent intake passages leading to reactive cylinders of the engine 1. An fuel injection valve 6 is disposed at each independent intake passage 2*a*. A fuel pump 8 in a fuel tank 7 supplies liquid fuel to the fuel injection valve 6 through a fuel supply pipe 9. Surplus liquid fuel is returned into the fuel tank 7 through a return passage 10. The fuel supply passage 9 is provided with a fuel filter 11. The return passage 10 is provided with a pressure regulator 12. Fuel vapor in the fuel tank 7 is collected into a surge tank 5. A purge passage 21 connecting the fuel tank 7 and the surge tank 5 is provided with a vapor storage canister 22. The purge passage 21 is provided with control valves 24 and 25 in an upstream purge passage section 21*a* and a downstream purge passage section 21*b*, respectively. The purge control valve 25 may be of an electromagnetic type which can take selectively an open state and a closed state, or otherwise which can cause a linear change in opening, such as a duty solenoid valve. A pressure sensor 23 is disposed in the upstream purge passage section 21*a* between the control valve 24 and the fuel tank 7. The vapor storage canister 22 has a relief passage 26 provided with a filter 27 and an electromagnetic relief valve 28 which is normally open. The fuel tank 7 has a roll-over valve 29 in close proximity to opening to the purge passage 21. This roll-over valve 29, whose opening at its full open position is small and consequently a throttling resistance even at the full open position, works to prevent liquid fuel from running out of and into the purge passage in an event of, for example, a fall of the vehicle.

Figure 2:
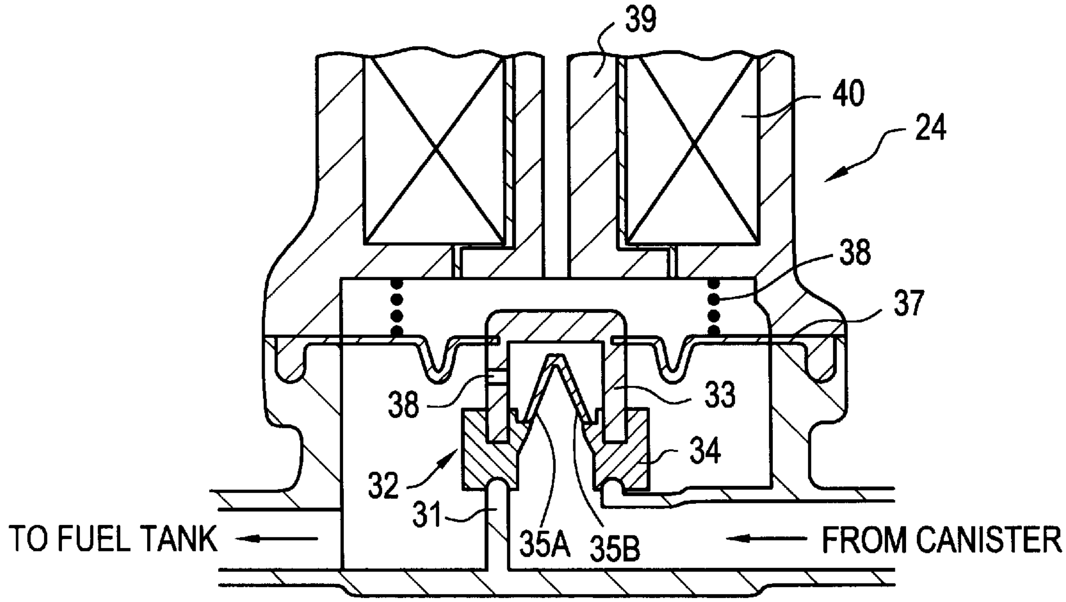
FIG. 2 is a cross-sectional view showing a purge control valve of the purge system by way of example.

FIG. 2 shows the control valve 24 by way of example. This control valve 24 basically has two active positions, namely an open position where it closes the upstream purge passage 21*a* and a closed position where it closes the upstream purge passage 21*a*. Further, the control valve 24 works as an exhalation valve at the closed position to permit communication between the fuel tank 7 and the canister 22 when a specific decrease in pressure level occurs between upstream and downstream sides of thereof. Specifically, the control valve 24 has a valve seat 31 facing upward and a movable valve body 32 comprised of a closed-end cylindrical shell 33, used also as a movable core, and an elastic mount member 34 made of rubber. The elastic mount member 34 is joined together to one end of the cylindrical shell 33. By means of this elastic mount member 34, the movable valve body 32 is mounted for up and down movement to the valve seat 31. The elastic mount member 34 is formed with a pair of rip shaped integral valves 35A and 35B. The cylindrical shell 33 is formed a hole 36 in its wall.

The cylindrical shell 33 has a diaphragm 37 secured together therewith. A return spring 38 urges the diaphragm 37 toward downward so as to have the mount member 34 mounted on the valve seat 31. Above the cylindrical shell 33 as a movable core there is disposed a fixed metal core 39 with a coil 40 therearound. When dienergizing the coil 40, the return spring 38 forces the mount member 34 against the valve seat 31 as shown in FIG. 2, bringing the control valve 24 in the closed state. The control valve 24 in the closed state provide negative pressure for the canister 22. Specifically, when the pressure is lower on the side of canister 22 than on the fuel tank 7, the lip shaped valves 35A and 35B close the cylindrical shell 33, preventing the interior of the fuel tank 7 from having pressure greatly creased. To the contrary, when the internal negative pressure in the fuel tank 7 raises above the specific level, in other words, when the negative pressure becomes lower by a specified level in the fuel tank 7 than in the canister 21, the lip shaped vies 35A open, bringing the fuel tank 7 and the canister 22 into communication with each other through the bole 36 to prevent the inside of the fuel tank 7 from increasing in pressure level. In the manner, the control valve 24 performs its exhalation function. The bole 36 has a small diameter, and hence it has an effect of throttling effect. When energizing the coil 40 of the control valve 24 in the state shown in FIG. 2, the fixed core pulls the cylindrical shell 33, removing the mount member 34 far away from the valve seat 31 to fully open the upstream purge passage 21*a* with an effect of no throttling resistance.

Fuel vapor discharged from the fuel tank 7 passes into the canister 22 through the control valve 24 and is adsorbed by activated charcoal in the canister. Because the relief valve 28 remains open and the purge valve 25 opens while the engine is ordinarily operating, the fuel vapor absorbed in the canister 22 is purged by negative pressure in the intake pipe 2 and collected into the intake pipe 2.

Figure 3:
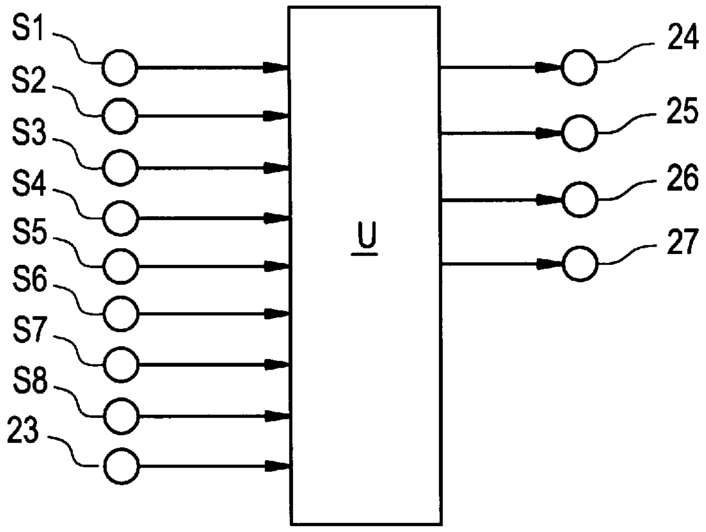
FIG. 3 is a schematic block diagram showing a control system of the leakage detection system in accordance with an embodiment of the invention.

FIG. 3 shows a control unit U in block diagram. The control unit U comprises a central processing unit, a read only memory (ROM) and a random access memory (RAM). The control unit U receives various signals from sensors S1 through S8 and the pressure sensor 23 and, based on these signals, provides control signals for the valves 24, 25 and 28 and a warning device 41 such as a warning lamp and a warning buzzer. Sensors S1 through S7 detects, respectively, the amount of liquid fuel left in the fuel tank 7, the atmospheric pressure, the temperature of cooling water as the temperature of engine, detects the rotational speed of engine, the degree of throttle opening as an engine load, the speed of vehicle, and the temperature of intake air.

Figure 4:
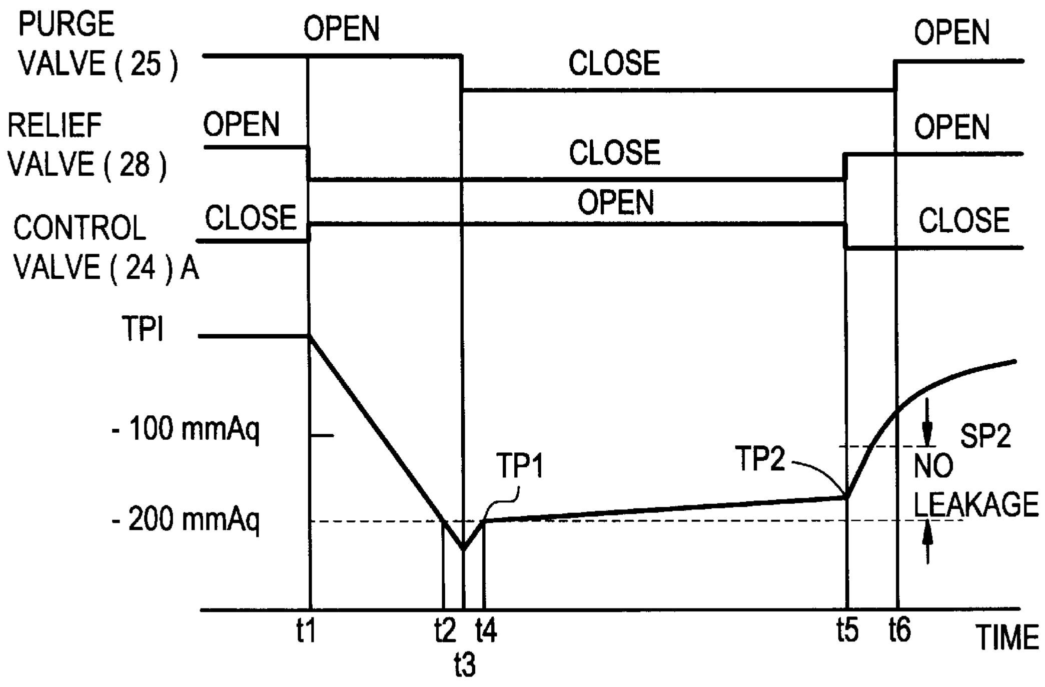
FIG. 4 is a time chart showing leakage detection control of the invention.
Figure 5A:
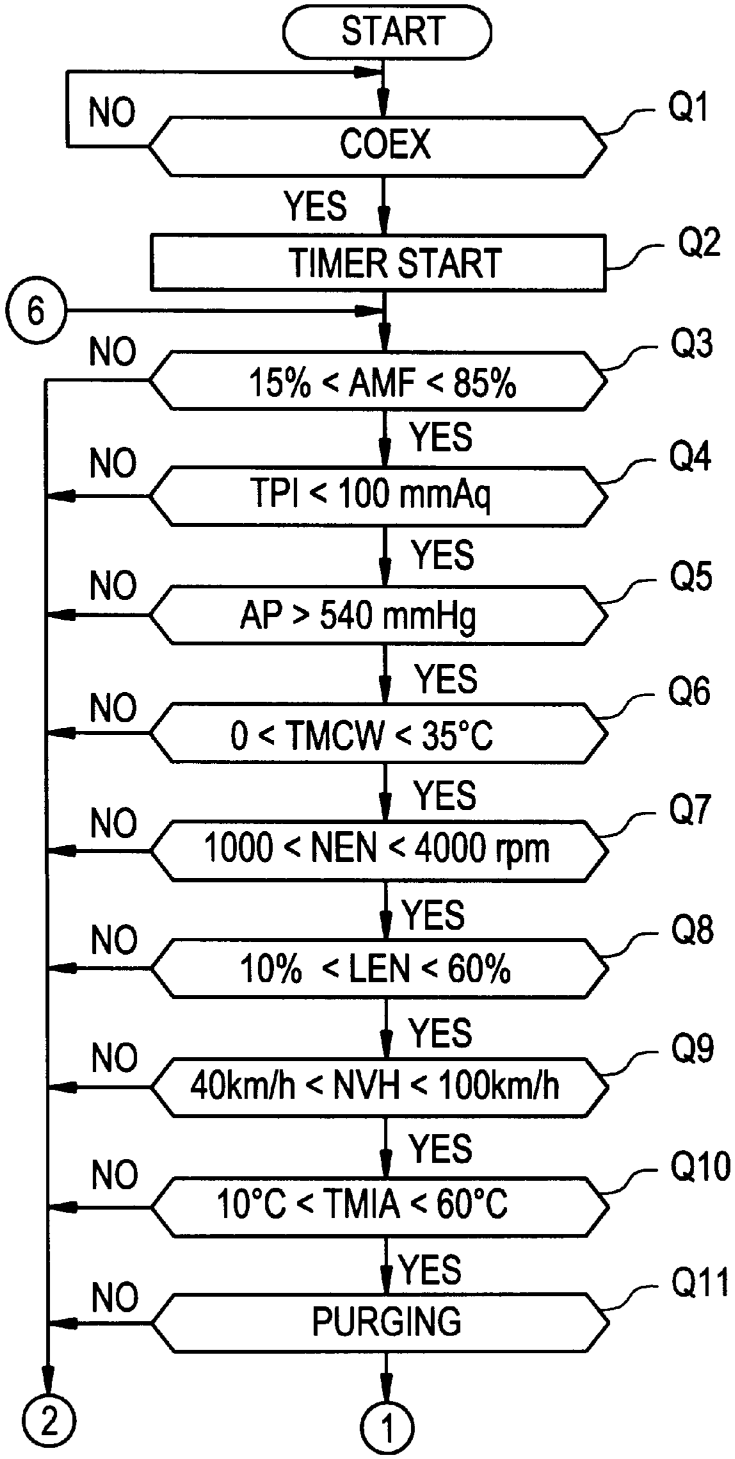
FIG. 5A through 5D show a flowchart illustrating the leakage detection control sequential routine.
Figure 5B:
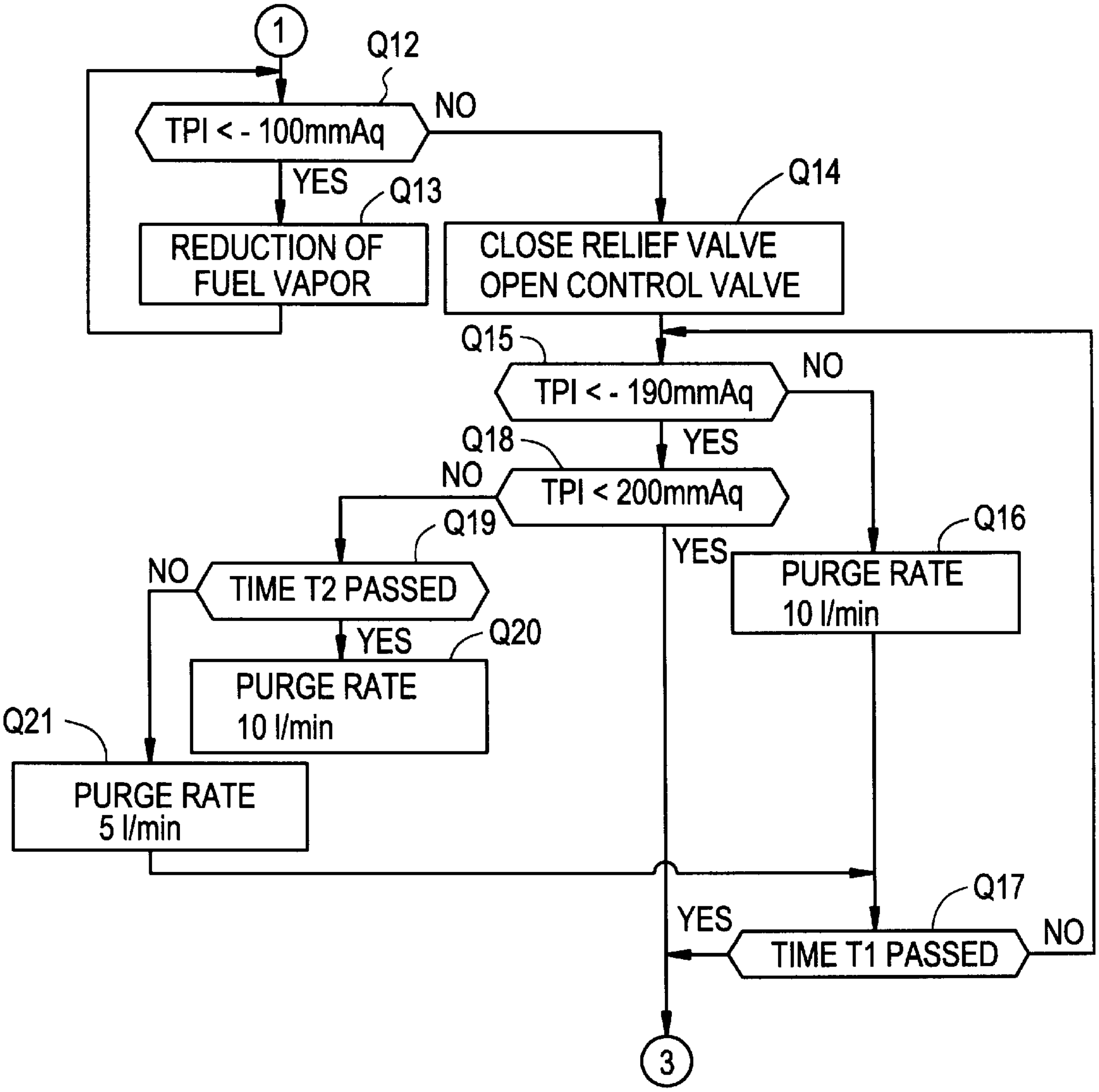
Figure 5C:
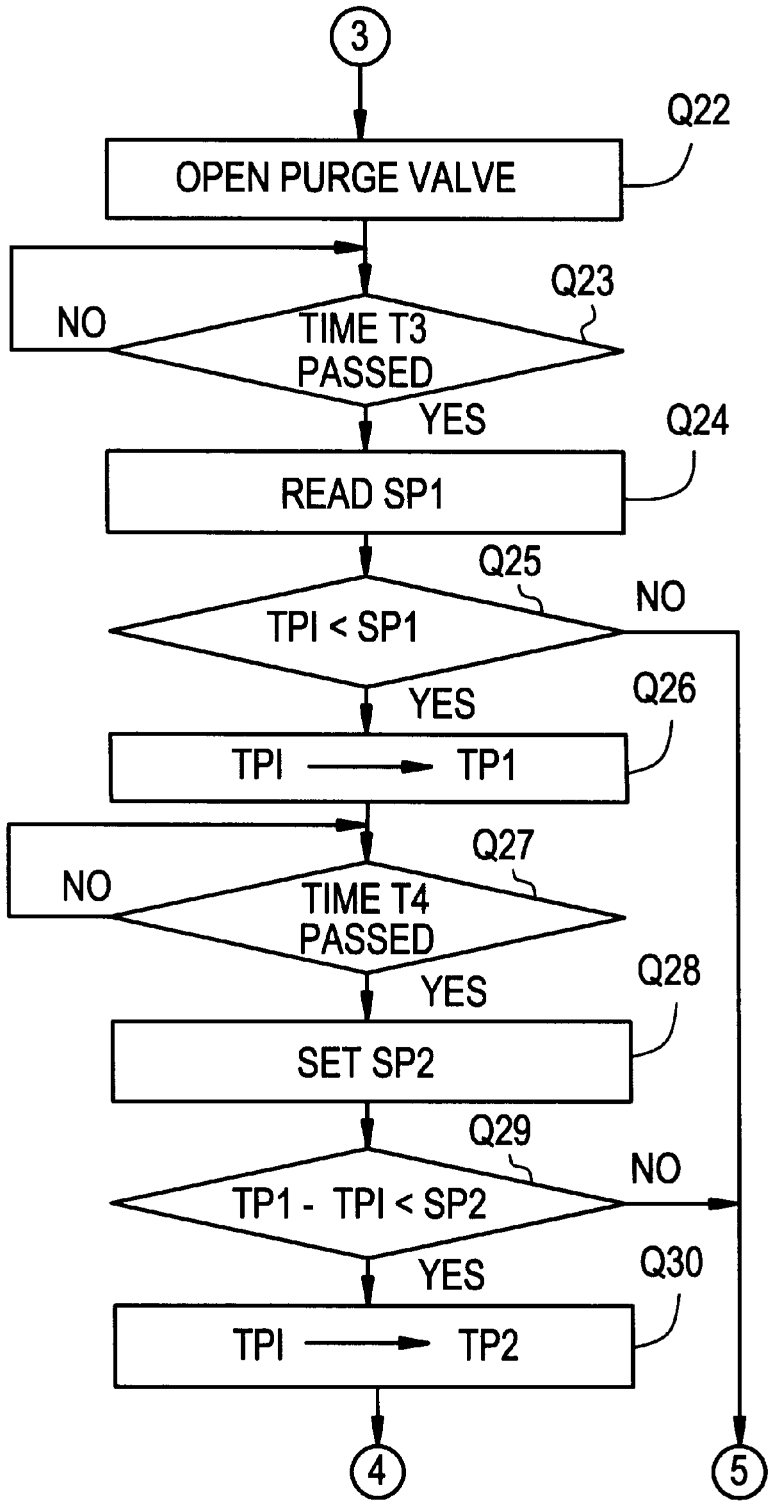
Figure 5D:
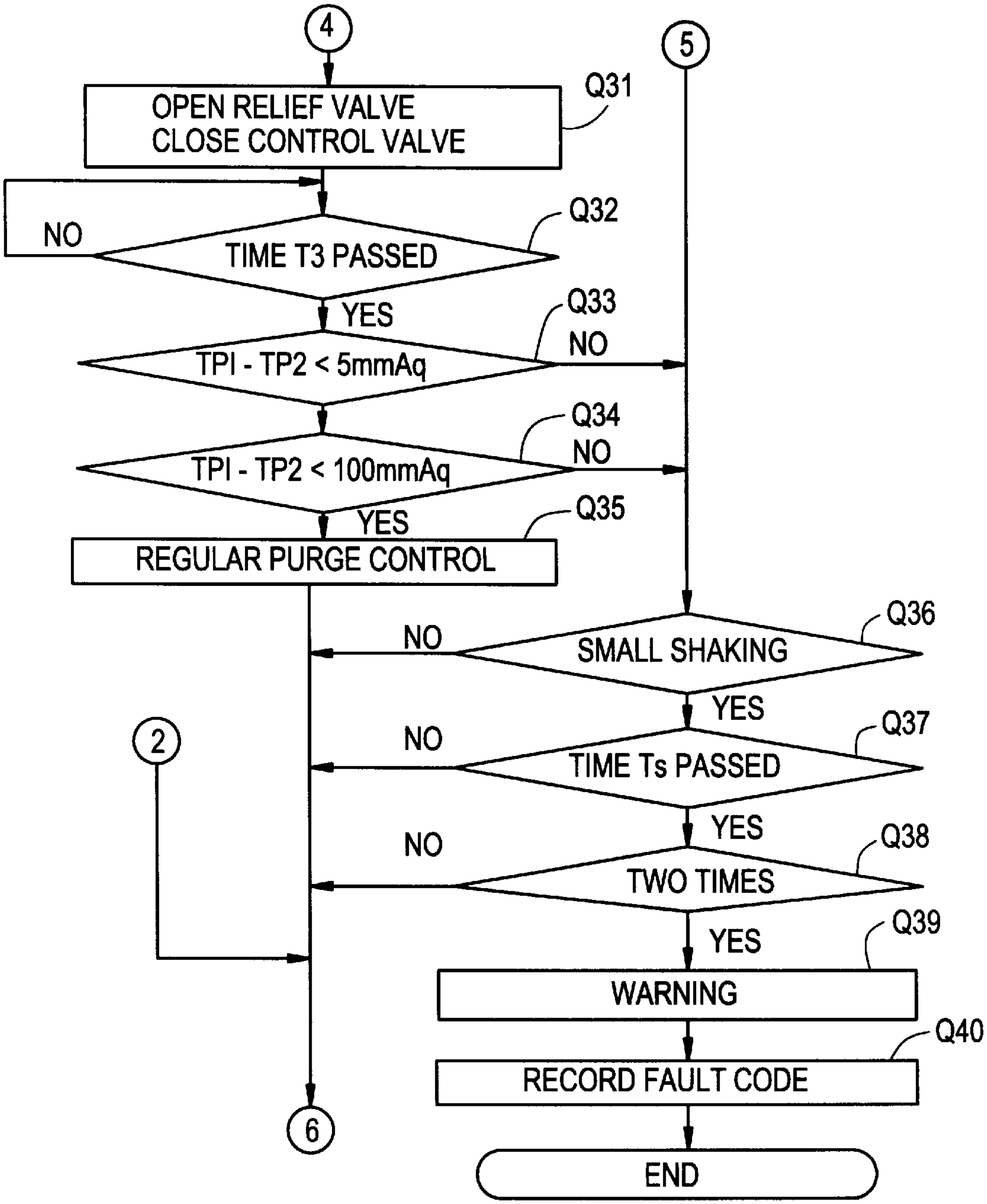

The control unit U performs a leakage judgement as to whether or not there is leakage of fuel vapor from the purge system including the fuel tank 7, the purge passage 21 and the canister 22. The fault or leakage judgement is performed as shown in FIG. 4. At a point of time t1 that the purge valve 25 opens, the relief valve 28 is closed and the control valve 24 opens, While these condition remains kept, negative intake pressure is introduced into the interior of the fuel tank 7 through the purge passage 21 with an gradual increase in negative pressure level in the fuel tank 7. When the negative pressure in the fuel tank 7 reaches a specified level of, for instance, −200 mm $H_2O$ at a point of time t2, and further drops a little at a point of time t3, the purge valve 25 is closed to isolate air-tightly the purge passage from the atmosphere. After a lapse of a little time from the point of time t3, the pressure level indicated by the pressure sensor 23 raises to the specified level (for instance −200 mm $H_2O$) at a point of time t4. This results from dissolution of a delay of negative intake pressure introduced into the fuel tank 7 caused due to throttling resistance of the roll-over valve 29.

The pressure level indicated by the pressure sensor 23 at the point of time t4 is taken as a first detective pressure level TP1, and the pressure level indicated by the pre sensor 23 at a point of time t5, for instance, 30 seconds after the detection of the first detective pressure level TP1 is taken as a second detective pressure level TP2. The leakage judgement is made based on a comparison of the deviation between these first and second detective pressure levels TP1 and TP2 with a threshold value. Specifically, if a change from the first detective pressure level TP1 to the second detective pressure level TP2 is great, it is regarded that the purge passage 21 has small pits or small holes and the fuel vapor leaks through theses holes, then, the purge system is decided to have broken down. On the other hand, when a change from the first detective pressure level TP2 to the second detective pressure level TP2 is small, it is regarded that the purge system functions normally. The degree of increasing change in pressure level in the fuel tank 7 depends upon the amount of fuel vapor produced in the fuel tank 7. In the leakage judgement, conditions for the leakage judgement are changed according to the amount of fuel vapor, so as to increase the frequency of leakage judgement The leakage judgement is performed following the sequence routine illustrated by a flowchart shown in FIG. 5A through 5D. When the flowchart logic commences and control proceeds directly to a determination at step Q1 as to whether complete explosion (COEX) is made. The engine is determination to make a complete explosion when the indication of engine speed higher than 500 rpm. is provided. This determination is repeated until the engine make a complete explosion. When a complete explosion is made, a timer starts to count a time from engine start at step Q2. Thereafter, a determination is made through steps Q3 to Q11 as to whether or not conditions for the leakage judgement have been satisfied. While the leakage judgement is performed an condition that the engine operates under conditions for purging, the judging condition are established according to the rotational speed of engine NEN) the load of engine (LEN), the speed of vehicle (NVH), and the temperature of intake air (TMIA) examined at steps Q7, QS, Q9 and Q10, respectively. Further, at step Q11, an ascertainment is made at step Q11 as to whether a fuel vapor purge is practically in execution. Through steps Q3 to Q6, a determination is made as to whether or not the leakage judging condition is satisfied. Practically, ascertainment is made as to that the amount of liquid fuel (AMF) is between an upper limit (85%) and a lower limit (15%) at step Q3, that the internal pressure (TPI) of the fuel tank 7 is lower in level than a specified level at step Q4, that the atmospheric pressure (AP) is higher in level than a specified pressure level at step Q5, and that the temperature of cooling water (MCW) is within a given temperature range at the start of engine operation at step Q6. The upper limit is set for the reason that the great amount of liquid fuel produces fuel vapor too much to perform the leakage judgement free from errors. On the other hand, the lower limit is set for the reason that an insufficient amount of fuel vapor relative to the internal spatial volume causes a change in pressure level too small to make the leakage judgement The upper limit relating to an internal pressure level of the fuel tank 7 is set for the ascertainment of an excessive amount of fuel vapor produced due to various cases. The upper limit relating to the temperature of cooling water, taken as the temperature of engine, at the start of engine operation is set for the reason that a high temperature of returning fuel vapor into the fuel tank 7 results in a large amount of fuel vapor produced in the fuel tank 7. The lower limit relating to the temperature of cooling water is set for the reason that fuel vapor purge into the intake passage is undesirable at the start of engine operation.

When any one of the determinations made at steps Q3 through Q11 is negative, the flowchart logic returns directly to step Q3 for another leakage judgement. On the other hand, all of the determinations made at steps Q3 through Q11 are affirmative, a determination is made at step Q12 as to whether the internal pressure of the fuel tank 7 is lower in level than −200 mm $H_2O$. When the internal pressure of the fuel tank 7 is lower in level than −200 mm $H_2O$, the purge valve 25 is nearly or completely closed at step Q13 to reduce or cut the amount of fuel vapor supplied to the intake passage 2, this is executed to prevent a rapidly increase in internal pressure level at the fuel tank 7. Thereafter, the determination concerning the fuel tank internal pressure is repeated at step Q12. On the other band, when the answer to the determination made at step Q12 is negative, the relief valve 28 is closed, and the control valve 24 is simultaneously opened at step Q14. As a result, the internal negative pressure of the fuel tank 7 gradually becomes greater with suction of the negative intake pressure. Determinations are subsequently made at steps Q15 and Q18 as to whether the fuel tank internal pressure (TPI) is lower than a specified level of −190mm $H_2O$ and, if lower, than a specified level of −200 mm $H_2O$, respectively. When the fuel tank internal pressure (TPI) is higher than −190 mm $H_2O$, the fuel vapor purge rate (FVPR) is set to a relatively large rate of, for example, 10 liters per minute so as to increase the negative pressure at a high rate at step Q16. Thereafter, a determination is made at step Q17 as to whether a specified time T1, for instance 25 seconds, from the point of time at which the relief valve 28 is closed and the control valve 24 is simultaneously opened at step Q14 has passed. This determination is made for the purpose that, when the fuel tank internal pressure (TPI) does not reach −200 mm $H_2O$, a subsequent step is taken under compulsion. Before a lapse of the specified time T, the determination is repeated at step Q15. On the other hand, when the fuel tank internal pressure (TPI) is lower than −190 mm $H_2O$ but higher than a specified level of −200 mm $H_2O$ , a determination is made at step Q19 as to whether a specified time T2, for instance 20 seconds, shorter than the specified time T1 from the point of time at which the relief valve 28 is closed, and the control valve 24 is simultaneously opened at step Q14 has passed. Before a lapse of the specified time T2, since, although the fuel tank internal pressure (TPI) reaches in proximity to the specified level of −200 mm $H_2O$ , there is left a time to the specified time T1 relating to which a decision is made at step Q17, the fuel vapor purge rate (FVFR) is set to a relatively small rate of, for example, 5 liters per minute at step Q21. Thereafter, the determination concerning the specified time T1 is made at step Q17. On the other hand, when the answer to the determination is affirmative, this indicates that a time near the specified time T1 has passed, then, after setting the fuel vapor purge rate (FVPR) to a relatively large rate of, for example 10 liters per minute so as to make the fuel tank internal pressure (TPI) reach the specified level of −200 mm $H_2O$ as earlier as possible at step Q20.

Figure 6:
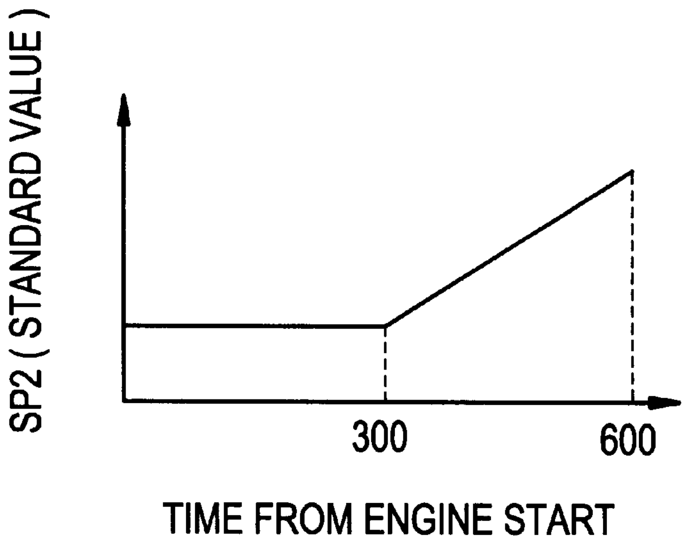
FIG. 6 is a graphical diagram showing a change of leakage judging threshold value according to passage of time after a start of engine operation.

When the fuel tank internal pressure (TPI) is lower than the specified level of −200 mm $H_2O$, or when the specified lime T1 has passed, the purge valve 25 is closed at step Q22. As a result, the purge system is isolated from the atmosphere, a change in pressure level becomes dependable only upon the generation of fuel vapor unless there is leakage of fuel vapor from the purge system. Subsequently, a determination is made at step Q23 as to whether a specified time T3, for instance two seconds, has passed from a point of time at which the purge valve 25 is closed at the time t3 shown in FIG. 4. After a lapse of the specified time T3 at the time t4 shown in FIG. 4, a threshold value SP1 for determination is read from a map defining a threshold value with respect to atmospheric pressure and cooling water temperature at the start of engine operation as parameters. For example, the threshold value SP1 is set to −130 mm $H_2O$ for standard engine operating conditions. As shown in FIG. 6, the threshold value SP1 is changed in such a direction as to provide higher pressure (becomes closer to the atmospheric pressure) with in increase in atmospheric pressure or a decrease in land height and with an increase in cooling water temperature. The threshold value SP1 is used to ascertain that the fuel tank internal pressure (TPI) is not sucked to the specified level of −200 mm $H_2O$ , which occurs when the relief valve 28 is accidentally fixed in its open position and when the purge valve 25 is accidentally fixed in its closed position other than when there is leakage from the purge system.

Thereafter, at step Q25, a determination is made as to whether the fuel tank internal pressure (TPI) is less than the threshold value SP1. When it is less than the threshold value SP1, after memorizing the latest fuel tank internal pressure (TPI) at step Q26, a determination is made at step Q27 as to whether a specified time T3, for instance 30 seconds, longer than the specified times T1 and T2 from the point of time at which the purge valve 25 is closed After waiting a lapse of the specified time T3 at a time t5 shown in FIG. 4, another threshold value SP2 is established according to a lapse of time from a start of endue operation at step Q28. This threshold value SP2 is provided as an upper limit for an increase in pressure level between the time t4 and the time t5 in the case where there is no leakage from the purge system and set to, for instance, 50 mm $H_2O$ for standard engine operating conditions. As shown in FIG. 6, the threshold value SP2 is fixed at a constant value, for instance, of −50 mm $H_2O$ before a lapse of a second specified period of time (for instance 300 seconds) which is shorter than the leakage judging period of time (600 seconds after an start of engine operation) and is increased larger with passage of time after a lapse of the second time period so as to make it hard to deliver a leakage judgement. The largest value of approximately 50 to 80 mm $H_2O$ is given for the change. While the threshold value SP2 is initially established as a standard value according to passage of time, it may be further corrected according to atmospheric pressure, cooling water temperature at a start of engine operation and the amount of liquid fuel as will be described later.

Thereafter, at step Q29, a determination is made as to whether the difference of the memorized detective pressure level TP1 from the present fuel tank internal pressure (TPI) is smaller than the second threshold value SP2. When the answer is affirmative, this indicates that the purge system is free from leakage, then, after replacing the detective pressure level TPI with the present fuel tank internal pressure (TPI) at the time t4 as an undated detective pressure level TP2 at step Q30, the relief valve 28 is opened and the control valve 25 is closed at a point of time t5 at step Q31. Subsequently, at step Q32, a determination is made as to whether a specified time T3, for instance 3 seconds, from the point of time at which the relief valve 28 is opened and the control valve 24 is simultaneously closed at step Q32 has passed. After a lapse of the specified time T3, a determination is made at step Q33 as to whether the difference of the present fuel tank internal pressure (TPI) from the up-dated detective pressure level TP2 is greater than a specified value of, for instance, 5 mm $H_2$. This determination concerns a fault of the purge system with the relief valve 28 remaining closed and is based on the fact that, when the relief valve 28 is fixed in its closed position, an increase in pressure level from the point of time t5 is small. When the answer to the determination is affirmative, another determination is subsequently made at step Q34 as to whether the difference of the present fuel tank internal pressure (TPI) from the up-dated detective pressure level TP2 is less than a specified value of, for instance, 100 mmAq. This determination concerns a fault that the control valve 24 is fixed in its open position. Although the control valve is due to open, if it remains closed, an atmospheric pressure introduced through the relief valve 28 and acts on the pressure sensor 23, causing a considerable increase in pressure level after the point of time t5. When the answer to the decision is affirmative, this indicates that both valves 24 and 28 are under normal operation and the purge system counters no leakage, then, the regular purge control is resumed at step Q35.

When the answer to the decision concerning the fuel tank internal pressure made at step Q25, Q29, Q33 or Q34 is negative, then determinations are subsequently made at steps Q36, Q37 and Q38 as to whether the fuel tank 7 shakes less, whether a lapse of specified time Ts of, for instance, 600 seconds has passed after the start of engine operation, and whether the affirmative answer to the decision at the previous step Q37 is provided two consecutive times, respectively. In the determination at step Q36, shaking of the fuel tank 7 is decided to be small when the difference between a ma mum amount and a minimum amount of liquid fuel detected in a specified period of time, for instance 10 seconds, is within a range of 10%. If the fuel tank 7 encounters strong shaking, the liquid fuel is agitated and causes large waves which generate a large amount of fuel vapor. In such a condition, the decision of leakage is interrupted. The determination concerning shaking of the fuel tank 7 may be made based on road conditions or cornering conditions which cause significant shaking of the fuel tank 7. In any case where the answer to the decision made at step Q36, Q37 or Q38 is negative, the flowchart logic returns to step Q3 for another leakage judgement. On the other hand, the answers to the respective determinations made at step Q36, Q37 or Q38 are affirmative a warning device 41 is actuated to provide an indication of leakage of the purge system at step Q39. Thereafter, at step Q40, a fault code of leakage is memorized for diagnosis on servicing.

In the leakage judgement sequence routine, the condition that the judgement of leakage of the purge system is made at least two consecutive times desirably increases an opportunity to perform the leakage judgement even in the circumstances that generate a lot of fuel vapor without errors of judgement.

Figure 8:
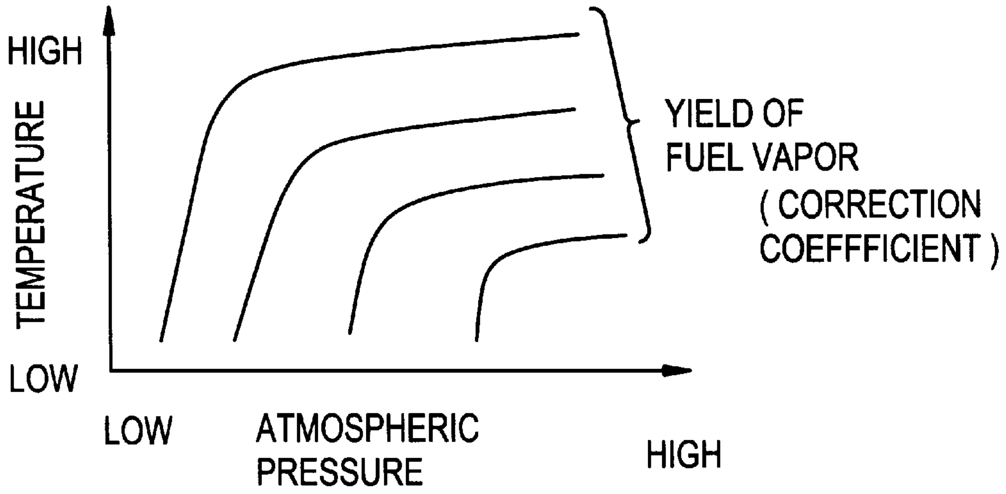
FIG. 8 is a graphical diagram showing a correction coefficient for the amount of evaporated fuel according to atmospheric pressure and temperature of engine cooling water at a start of engine operation.
Figure 9:
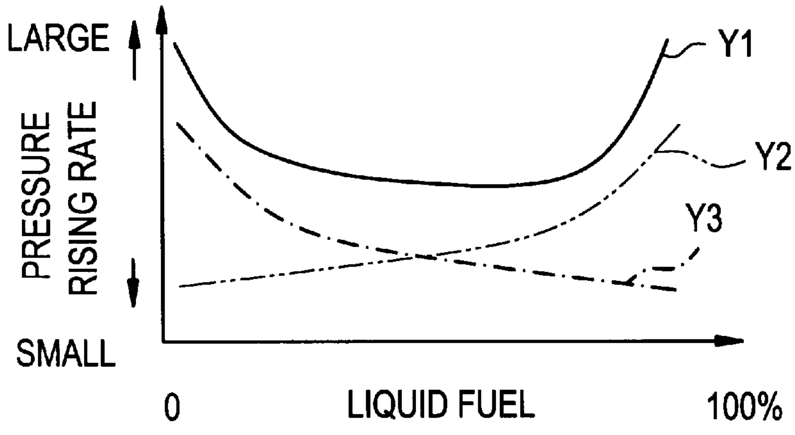
FIG. 9 is a graphical diagram showing a correction coefficient for a rising rate of internal pressure level of a fuel tank according to the amount of liquid fuel left in the fuel tank.

The standard threshold value SP2 may be corrected with fast and second correction coefficients determined according to at least one of atmospheric pressure and engine temperature. Specifically, a first correction coefficient on a yield of fuel vapor is determined from a map such as shown in FIG. 8. The first correction coefficient is determined in such a way as to make it more hard to deliver a judgement of leakage with a decrease in atmospheric pressure level and an increase in the temperature of engine cooling water at a start of engine operation as the temperature of engine at a start of operation. A second correction coefficient which is defined as a pressure increasing rate is determined according basically to the amount of liquid fuel as shown in FIG. 9. The standard threshold value is multiplied by the first and second correction coefficients to provide an eventual threshold value. The second correction coefficient is given by curve Y1. More precisely, the second correction coefficient may be defined in consideration of a yield of fuel vapor as shown by curve Y2 or in consideration of an empty space of the fuel tank 7 as shown by curve Y3.

The pressure increasing rate as the second correction coefficient corresponds to a change in pressure occurring between the points of time t3 and t4 in FIG. 4. Accordingly, any value substitutive for the pressure change may be employed. For example, a change in fuel tank internal pressure (TPI) between the points of time t4 and t5 may be compared with the standard threshold value. The detective pressure level TP2 (in the case where a time between the points of time t3 and t4 is constant) or a time necessary to develop the detective pressure level TP2 after the point of time t3 may otherwise be compared with the standard threshold value.

In order to make it hard to deliver a judgement of leakage when a large amount of fuel vapor is yielded, the threshold value is changed in such a direction as to increase the fuel tank internal pressure (TPI) toward the atmospheric pressure level, in other words, to increase the rate at which the fuel tank internal pressure (TPI) increases, or in such a direction as to make the constant time between the points of time t3 and t4 shorter. Further, in order to make it hard more to deliver a judgement of leakage as the yield of fuel vapor increases due to a decrease in atmospheric pressure, the specific pressure level with which the fuel tank internal pressure (TPI) is compared at the point of time t3 for a judgement of closing the purge valve 25 may be changed toward a more lower negative level. In this case the judgement of leakage is made by comparing the detective pressure level TP2 at the point of time t5 after a passage of a specified time from the establishment of the specific pressure level with the threshold value.

The critical time Ts from a At of engine operation used in the determination at step Q37 may be correctly changed according to external circumstances affecting the yield of fuel vapor in such a way as to be shortened when external circumstances causes an increase in the yield of fuel vapor. For example, the critical time Ts is shortened more when the atmospheric pressure is higher than when it is lower. The determination relating to the critical time Ts may be made prior to or between steps Q3 through Q11 for interrupting the leakage judgement after passage of the critical time Ts. In place of interruption of a judgement of leakage only after passage of the critical time Ts in the above embodiment, a judgement of leakage may be delivered after passage of the critical time Ts on condition that it is determined before passage of the critical time Ts that there is no leakage.

The first standard threshold value SP1 is used for a judgement of leakage of a large amount of fuel vapor, and the second standard threshold value SP2 is used for a judgement of leakage of a small amount of fuel vapor. The first standard threshold value SP1 may be correctly changed as well as the second standard threshold value SP2.

Figure 7:
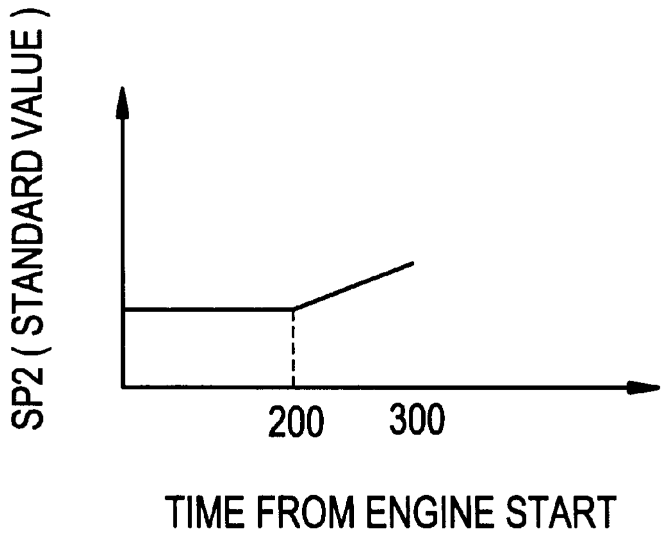
FIG. 7 is a graphical diagram showing a change of leakage judging threshold value according to passage of time after a start of engine operation for a large yield of fuel vapor.

The critical time Ts may be changed according to passage of time in addition to the yield of fuel vapor. In this case, the critical time Ts is established as shown in FIG. 6 for small yields of fuel vapor and as shown in FIG. 7 for larger yields of fuel vapor. For example, the critical time Ts is set to 400 seconds shorter for larger yields of fuel vapor than 600 seconds for smaller yields of fuel vapor, for example. Similarly, the second time is changed to 200 seconds from 300 seconds, for example. The same change as made for the standard threshold value SP1 may be made and, however, desirably enhanced more than for the standard threshold value SP2. The change of the standard threshold value SP1 may be executed only before passage of the second time period.

In a direct injection type of super lean burn gasoline engines which is one of typical spark firing types capable of burning a fuel mixture with an air-to-fuel ratio considerably higher than a stoichiometric air-to-fuel ratio, while the engine idles or operates with low engine load, the temperature of engine, and hence the temperature of a lean air-to-fuel mixture returning to a fuel tank is hard to rise. Accordingly, in the case where the engine continuously operates with low engine load for a specified period of time, in other words, when a fuel mixture is returned at low temperatures, even after engine operation with moderate or high engine load, the leakage judgement may be performed after passage of the specified period of time but before the next presence of the specified period of time.

Although the present invention has been described in detail by way of example with reference to the accompanying drawings, it is to be understood that various variants and modifications may occur to those skilled in the art. Such variants and modifications otherwise depart from the scope of the present invention, they are intended to be covered by the following claims.

What is claimed is:

1. A leakage diagnostic system for making a judgment of leakage of a fuel purge system based on a rising rate of pressure in purge passage means between a fuel tank and an intake system of an engine isolated from the atmosphere after lowering the interior of the purge passage below a specified negative pressure level, said leakage diagnostic system comprising:

pressure regulating means for developing negative pressure in said purge passage means;

operation detection means for detecting a pressure level of the inside of said purge passage means; and control means for controlling said pressure regulating means to cause a specified change in said negative pressure level, comparing a change in said negative pressure level caused within a specified period of time with a predetermined judging value, delivering a judgment of leakage from said fuel purge system when said change is larger than said predetermined judging value, and maintaining said predetermined judging when said change becomes greater than said predetermined judging value within a specified time from an engine start and increasing said predetermined judging with a passage of time when said change becomes greater than said predetermined judging value after said predetermined time from an engine start so as to make it harder to deliver said judgement of leakage.

2. A leakage diagnostic system as defined in claim 1, wherein said control means isolates said purge system from the atmosphere after lowing pressure in said purge system below an atmospheric pressure level, and delivering a judgement of leakage of said purge system when said change caused within another period of time shorter than said specified period of time after said point of time is larger than said judging level.

3. A leakage diagnostic system as defined in claim 1, wherein said control means detects and taking a start of engine operation as said specified engine operating condition.

4. A leakage diagnostic system as defined in claim 1, wherein said control means detects and taking engine idling as said specified engine operating condition.

5. A leakage diagnostic system as defined in claim 1, wherein said pressure regulation means includes a purge valve purging fuel vapor into said purge passage and a relief valve disposed upstream in said purge passage from said purge valve for communicating said purge passage with the atmosphere, and said control means opens said purge valve while closing said relief valve to develop negative pressure in said purge passage means.

6. A leakage diagnostic system defined in claim 1, wherein said control means correctly changed judging level so as to make it more hard to deliver a judgement of leakage as atmospheric pressure level decreases.

7. A leakage diagnostic system defined in claim 1, wherein said control means correctly changes said judging level so as to make it more hard to deliver a judgement of leakage as engine temperature at a start of operation increases.

8. A leakage diagnostic system as defined in claim 2, wherein said pressure regulation means includes a purge valve purging fuel vapor into said purge passage and a relief valve disposed upstream in said purge passage from said purge valve for communicating said purge passsage with the atmosphere, and said control means opens said purge valve while closing said relief valve to develop negative pressure in said purge passage means and closes said purge valve when said negative pressure is developed to a specified level so as to isolate said purge passage from the atmosphere.

9. A leakage diagnostic system as defined in claim 2, wherein said control means correctly decreases said judging level as liquid fuel in a fuel tank decreases in amount.

10. A leakage diagnostic system for making a judgment of leakage of a fuel purge system based on a rising rate of pressure in a purge passage connected between a fuel tank and an intake system of an engine isolated from the atmosphere after lowering the interior of the purge passage below a specified negative pressure level, said leakage diagnostic system comprising:

a purge valve installed in said purge passage;

a negative pressure sensor for detecting a pressure level of negative pressure introduced into said purge passage through said purge valve; and a control unit for counting a time after an engine start, controlling said purge valve to open to admit said negative pressure into said purge passage, comparing a change in level of said negative pressure in said purge passage caused within a specified period of time with a predetermined judging value, judging that there occurs leakage from said fuel purge system when said change is larger than said predetermined judging value, and increasing said predetermined judging value within a specified time counted from said engine start.

11. A leakage diagnostic system as defined in claim 10, wherein said control unit changes said judging level so as to make it harder to deliver a judgment of leakage as an engine temperature at said engine start rises.

12. A leakage diagnostic system as defined in claim 10, wherein said engine is equipped with a fuel delivery passage through which fuel is delivered to a fuel injector from said fuel tank and a fuel return passage through which a surplus of fuel is returned from said fuel injector to said fuel tank.

* * * * *